United States Patent [19]

Sutton et al.

[11] Patent Number: 5,552,640
[45] Date of Patent: Sep. 3, 1996

[54] ELECTRICAL POWER GENERATING ARRANGEMENT WITH COMPUTER CONTROL FOR VARYING ENGINE SPEED AS A FUNCTION OF LOAD DEMAND

[75] Inventors: Jeffrey A. Sutton, Solihull; Iain J. Tebbutt, Ashby De La Zouch, both of England

[73] Assignee: British Gas plc, London, England

[21] Appl. No.: 296,912

[22] Filed: Aug. 31, 1994

[30] Foreign Application Priority Data

Sep. 17, 1993 [GB] United Kingdom ............ 9319323

[51] Int. Cl.⁶ .................... F02N 11/06; H02P 9/04
[52] U.S. Cl. ........................ 290/40 B; 290/40 R
[58] Field of Search ................ 290/40 A, 40 B, 290/40 C, 40 R; 322/20, 22, 24, 29, 40

[56] References Cited

U.S. PATENT DOCUMENTS

| | | | |
|---|---|---|---|
| 4,307,690 | 12/1981 | Rau et al. | 123/353 |
| 4,322,630 | 3/1982 | Mezera et al. | 290/40 C |
| 4,492,874 | 1/1985 | Near | 290/40 B |
| 4,661,761 | 4/1987 | Katsumata | 322/28 |
| 4,841,218 | 6/1989 | Rosinnes et al. | 322/24 |
| 4,870,339 | 9/1989 | Furukawa et al. | 322/29 |
| 5,006,781 | 4/1991 | Schultz et al. | 322/25 |

FOREIGN PATENT DOCUMENTS

| | | |
|---|---|---|
| 0041585 | 12/1981 | European Pat. Off. . |
| 0268160 | 5/1988 | European Pat. Off. . |
| 0280876 | 9/1988 | European Pat. Off. . |
| WO86/03907 | 7/1986 | WIPO . |
| WO89/11179 | 11/1989 | WIPO . |
| WO94/14000 | 6/1994 | WIPO . |

OTHER PUBLICATIONS

Patent Abstracts of Japan, vol. 11, No. 61 (E–483), Feb. 25, 1987, JP–A–61 221 599, Oct. 1, 1986.

Primary Examiner—Steven L. Stephan
Assistant Examiner—Christopher Cuneo
Attorney, Agent, or Firm—Oblon, Spivak, McClelland, Maier & Neustadt, P.C.

[57] ABSTRACT

An electrical power generating arrangement (for example, in a combined heat and (CHP) system in is which fixed frequency AC electric power for supply to the mains or grid is output from a frequency converter supplied with a variable frequency AC power input from an electrical generator driven by an internal combustion engine. The speed of the engine is varied by operation of a throttle controlled by a controller containing a predetermined engine map representing variation of engine speed as a function of the variation in electrical power output from the frequency converter to meet the demand of an external electrical load. On the load demand changing, the controller signals the frequency converter to give a changed new power output to meet the changed demand. The controller consults the map to determine the new engine speed corresponding to the new power demand and operates the throttle to cause the engine to run at the new speed.

12 Claims, 6 Drawing Sheets

ELECTRICAL POWER GENERATING ARRANGEMENT WITH COMPUTER CONTROL FOR VARYING ENGINE SPEED AS A FUNCTION OF LOAD DEMAND

BACKGROUND OF THE INVENTION

This invention concerns an electrical power generating arrangement from which the electrical power output is to be connected to the electrical mains.

The electrical power generating arrangement may be included in a combined heat and power system (CHP), though it need not necessarily be.

In some known CHP systems the electrical generator feeding its output into the electrical mains or grid is rotated at substantially constant speed by a reciprocating internal combustion engine giving a substantially constant speed rotary output driving the generator. Since the engine rotates at a substantially constant number of revolutions per minute (r.p.m.) whatever the electrical power demand from the generator by an external circuit being supplied, the engine is not necessarily operating at optimum efficiency which optimum efficiency may occur at a lower r.p.m. than the aforesaid constant r.p.m. for low power demand or at a higher r.p.m. for higher power demand. Also best advantage cannot be taken of using high revving high performance engines produced for motor vehicles.

OBJECT OF THE INVENTION

An object of the invention is to provide an electrical power generating arrangement from which the electrical power output is to be connected to the electrical mains or grid, in which the arrangement is capable of being used with the engine running at variable speed.

SUMMARY OF THE INVENTION

According to the invention there is provided an electrical power generating arrangement from which the electrical power output is to be connected to the electrical mains, said electrical power generating arrangement comprising a reciprocating internal combustion engine and an electrical power generator rotatably driven by rotary drive derived from said engine, frequency converter means for converting variable frequency AC derived from said generator to a substantially fixed frequency AC for delivery to said mains, control means, said control means being arranged for controlling the speed of said engine, and said control means being arranged for varying the engine speed as a function of variation of the electrical power to be delivered from said frequency converter means.

The engine can be run at varying speeds causing the generator to give variable frequency AC electrical power output which is converted by the frequency converter means to an AC electrical power output having substantially the predetermined constant frequency of the mains.

BRIEF DESCRIPTION OF THE DRAWINGS

The invention will now be further described, by way of example, with reference to the accompanying drawings in which:—

DESCRIPTION OF THE PREFERRED EMBODIMENT

Figure 1:
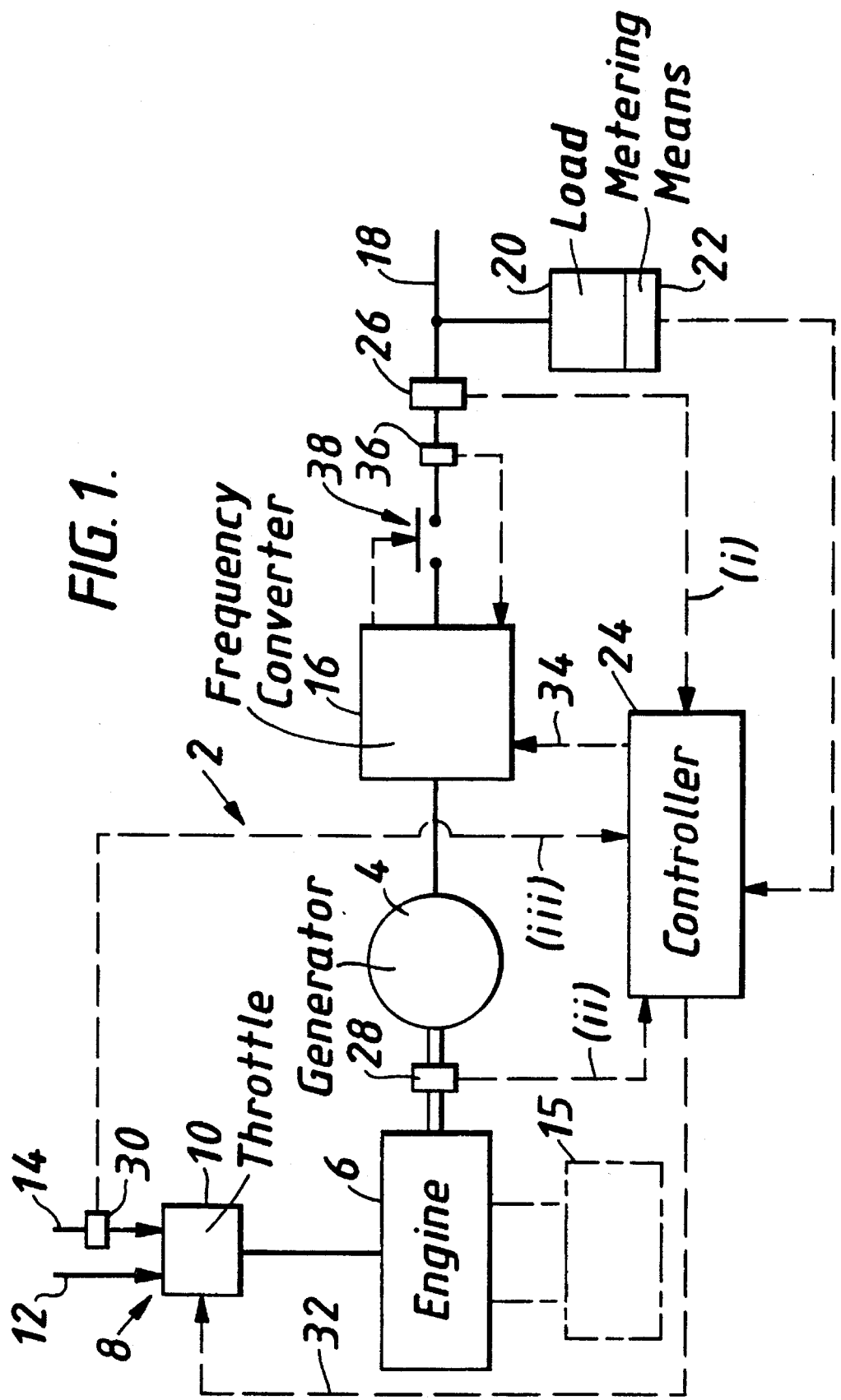
FIG. 1 is a diagrammatic representation of an electrical power generating arrangement formed according to the invention.

FIG. 1 shows an electrical power generating arrangement 2 in which an electrical power generator 4 is rotatably driven by rotary drive taken from a reciprocating internal combustion engine 6. The generator 4 is driven at the same speed as the engine 6 with which the generator is fast (in known manner) in rotation.

The engine 6 is supplied with a controlled mixture of fuel and combustion air by any suitable fuel/air control means 8, for example a carburettor or fuel injection system (known per se); the aforesaid fuel/air control means 8 comprising a throttle 10, a supply path 12 for combustion air (for example, from atmosphere), and a supply path 14 for fuel. The fuel may be liquid, for example petrol or diesel oil, or may be fuel gas, for example natural gas, provided in know manner via a pressure regulator from which the gas emerges at a desired predetermined pressure for supply to the fuel/air control means 8.

The generating arrangement 2 may be part of a combined heat and power system (CHP) wherein heat generated by the engine 6 is extracted by heat exchange means 15 for some useful heating purpose. For example the heat exchange means 15 may extract heat from engine coolant, for example water, circulating in the engine cooling system and/or from hot exhaust gases from the engine.

The generator 4 gives three-phase AC power output supplied as input to a frequency converter 16. The frequency converter 16 may be of any suitable kind (known per se) for example a cycloconverter or, as is preferably used in FIG. 1, a rectifier-inverter, and comprises means, for example phase-controlled silicon controlled rectifiers, to control electric power flow through the frequency converter 16. The frequency converter 16 converts a variable frequency AC input into a substantially fixed frequency AC output corresponding to the frequency of the mains.

Generating arrangement 2 can be connected to supply electrical into the electrical power grid or mains 18 to which a load 20 is connected to be powered either by the mains or wholly or in part by the generating arrangement 2. The electrical circuit in which the load 20 is included also includes electrical power measuring or metering means 22 arranged to send a signal to controller 24 indicating the electrical power being demanded by the load 20.

Controller 24 comprises electronic apparatus comprising computer means. The controller 24 is also arranged to receive signals (i) from electrical power measuring or metering means 26 indicating the electrical power output from the frequency converter 16, (ii) from rotary speed measuring means 28 indicating the rotational speed of the output drive from the engine 6, and (iii) from fuel measuring means 30 indicating the amount of fuel consumed in a given period of time. The controller 24 processes the aforesaid signals and is arranged to give output control signals on signal paths 32 and 34. The signals on path 32 actuate throttle operating means to vary the percentage the throttle 10 is open. The signals on path 34 are regulating signals to regulate the frequency converter 16 to vary, as desired, the electrical power output from said frequency converter means.

Observing means 36 to observe the voltage and voltage phase of the mains voltage supplies signals representing its observations to the frequency converter 16 which is adapted to cause actuation of electrical contact means 38 so that the latter is closed when the electrical power output from the frequency converter has a desired voltage sufficient to ensure that said power output can enter the grid or mains 18 and the voltage output from the frequency converter is in phase with the grid or mains voltage.

Figure 2:
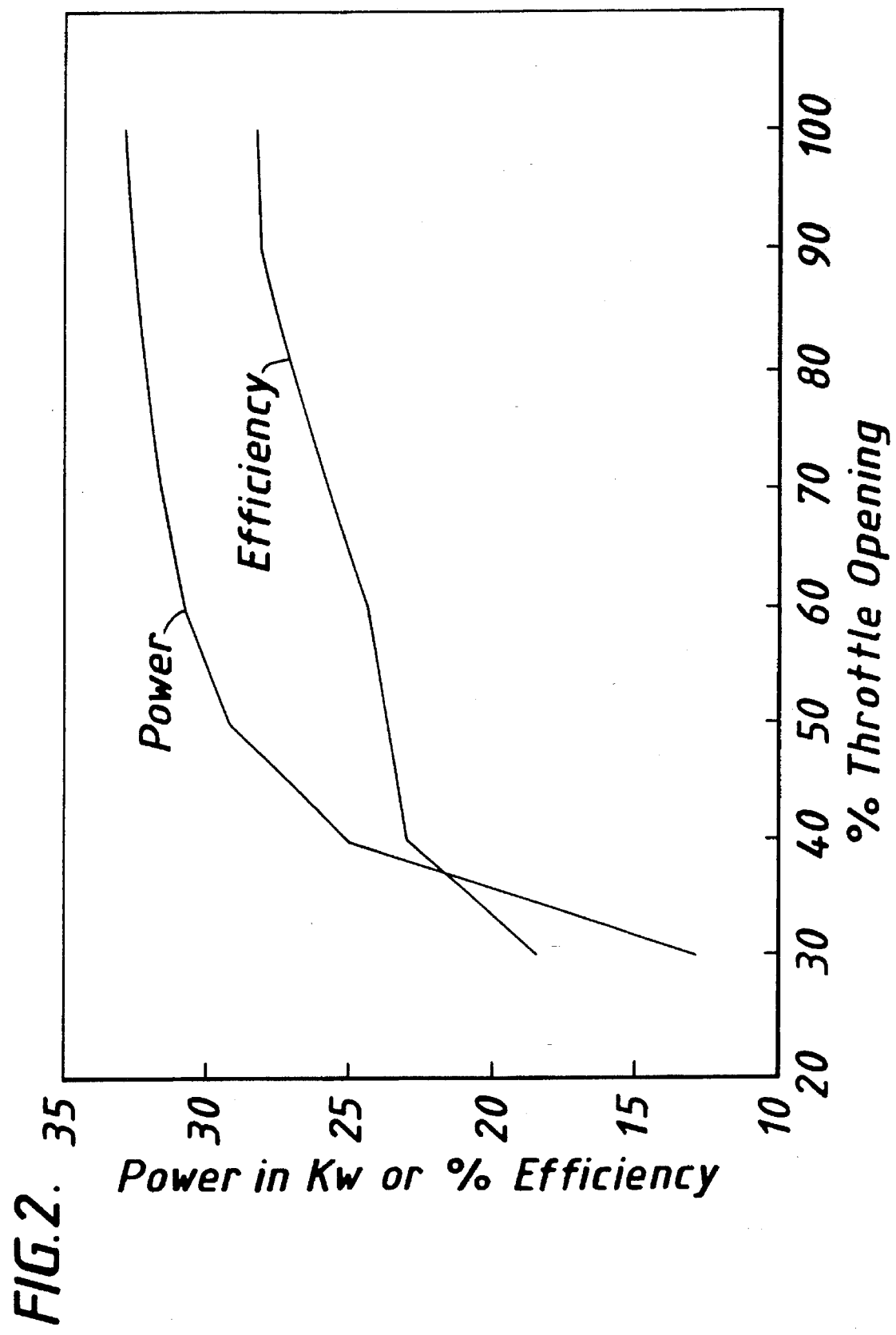
FIGS. 2, 3 and 4 show examples of graphs representing variation of engine efficiency plotted against variation of percentage throttle opening for an internal combustion engine of the kind used in the arrangement in FIG. 1 running at 1100 r.p.m., 1300 r.p.m. and 1500 r.p.m. respectively, or show examples of graphs representing variation of electrical power output in kilowatts from frequency converter means of the kind used in the arrangement in FIG. 1 plotted against variation of the percentage throttle opening for the said engine running at 1100, 1300 and 1500 r.p.m. respectively.
Figure 3:
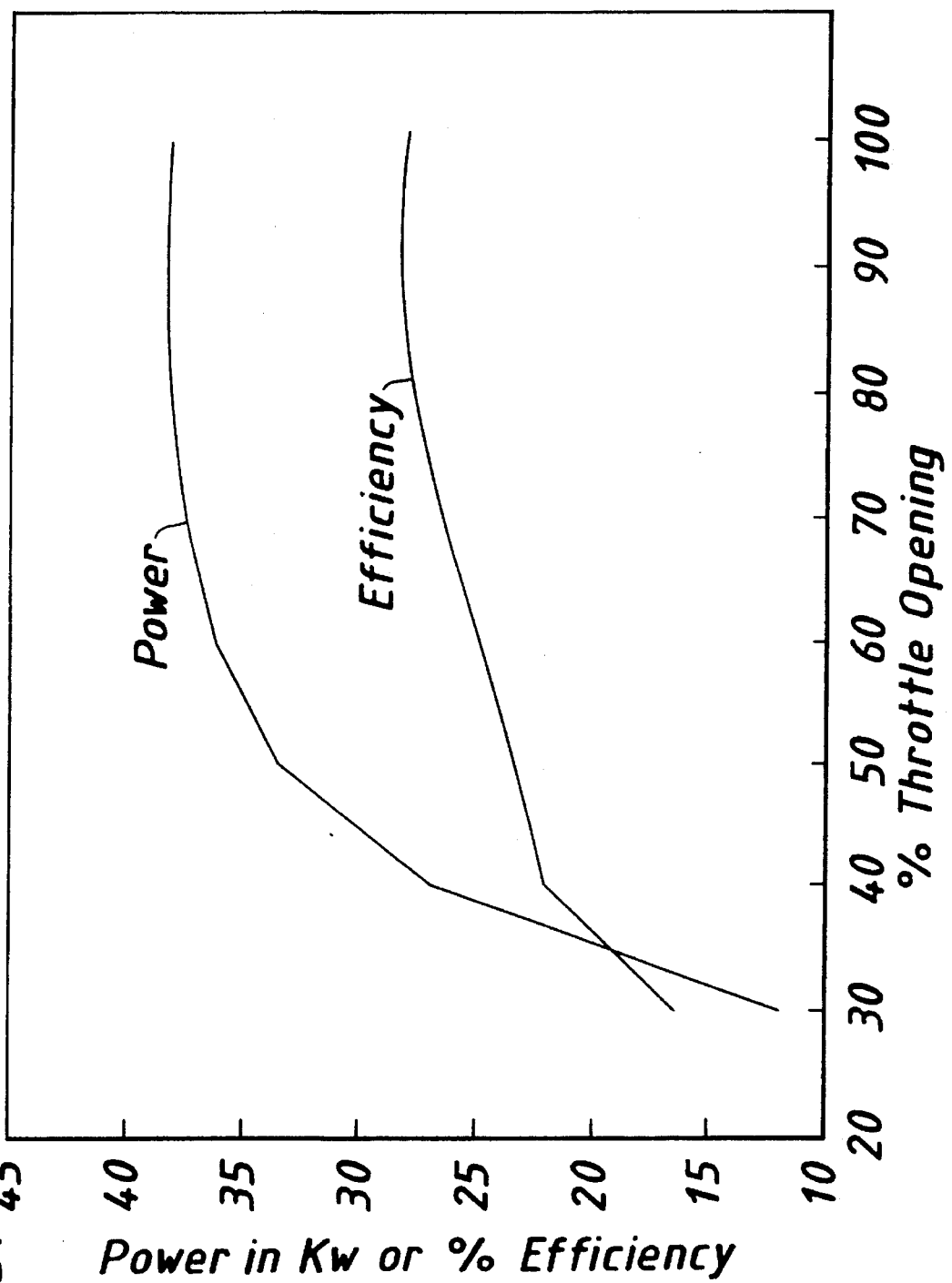
Figure 4:
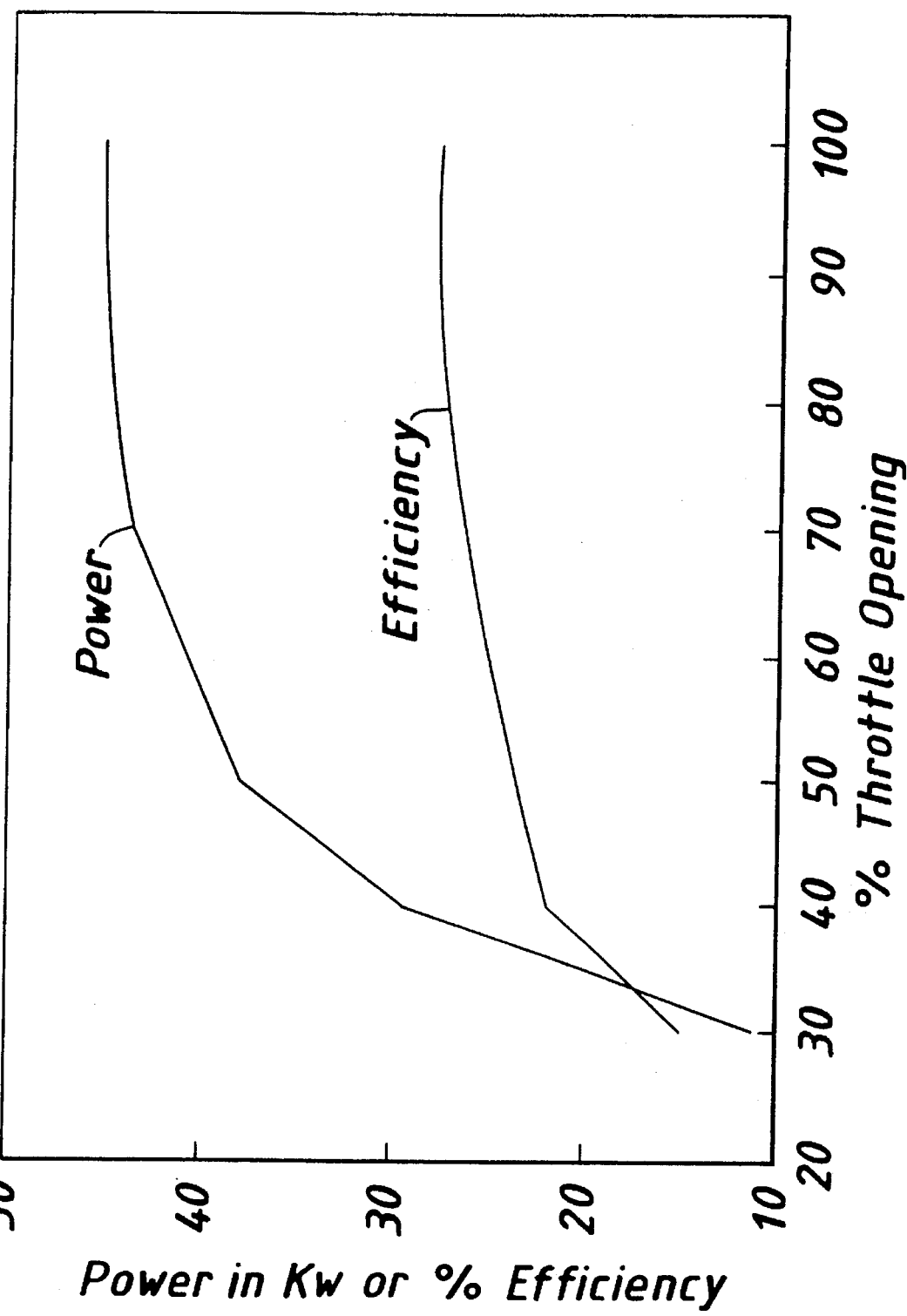

At the time of manufacture of the generating arrangement 2 or on site at, for example, the time that the generating arrangement 2 is being installed or at some other desired time, the arrangement is run at various fixed engine speeds as exemplified in FIGS. 2, 3 and 4 to obtain operating data. For example, the data can include the electrical power output from the generator 4 measured at different percentage openings of the throttle 10 and, at the same time, at those throttle openings the efficiency of the engine 8 is calculated using the expression:—

$$\text{Efficiency} = \frac{\text{Shaft Power Output From Engine 6}}{\text{Fuel Power Input To Engine 6}} \times 100$$

wherein the shaft power output is the mechanical output power produced at the engine crank-or output drive-shaft which can be determined from the measurement of the electrical power output from the frequency converter means 16, assuming that the efficiency of electrical generation is substantially constant at all operating conditions, and wherein the fuel power input to the engine is the thermal energy released by complete combustion of the fuel consumed by the engine per unit time.

Figure 5:
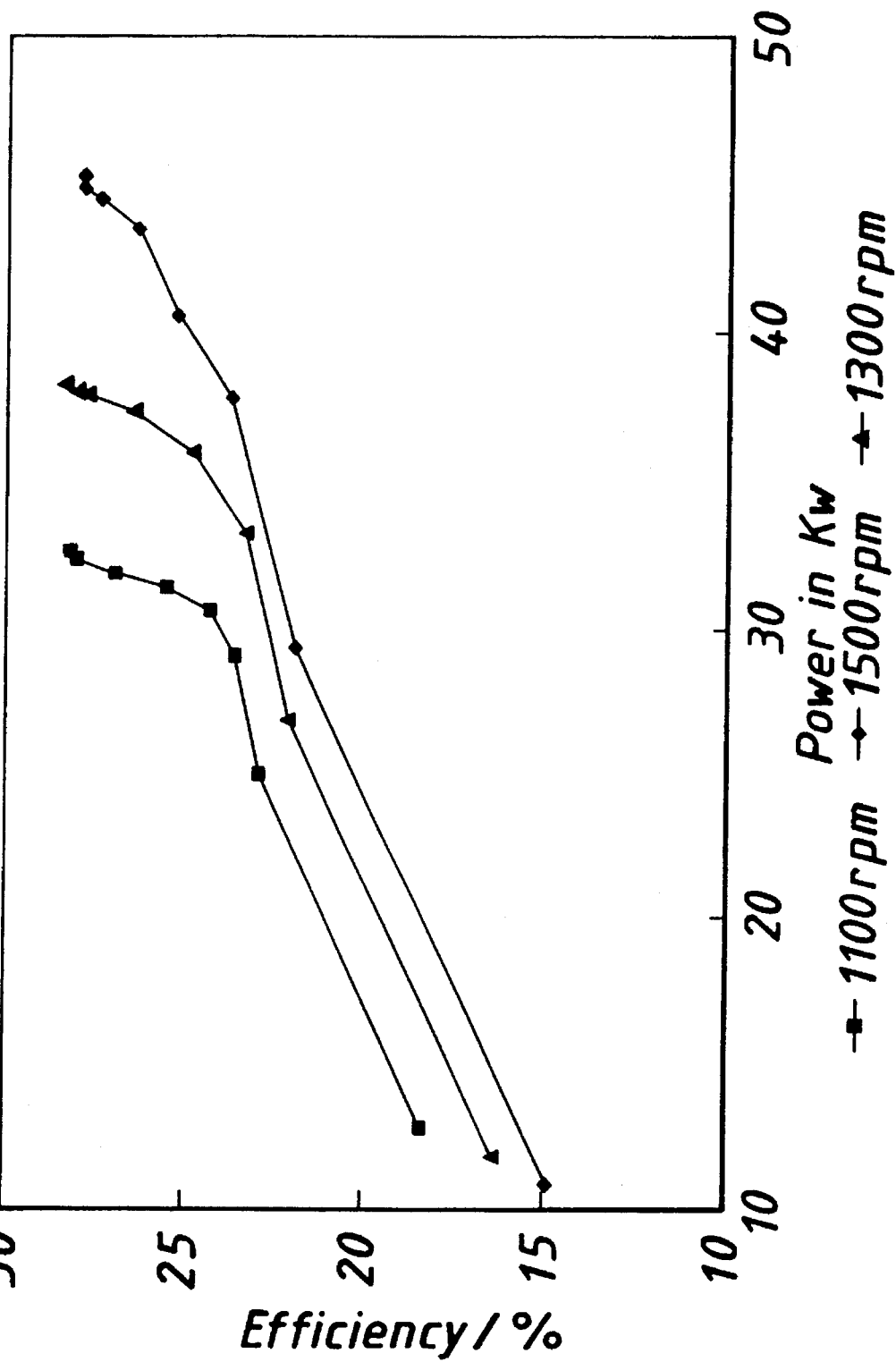
FIG. 5 shows a set of graphs of variation in the engine efficiency plotted against variation in the electrical power output from the frequency converter means (derived from data used to produce FIGS. 2 to 4) when the engine is running at 1100, 1300, and 1500 r.p.m. respectively.

Such data can be used to produce graphs or maps of the efficiency at which the engine 6 operates at different engine speeds to drive the generator 4 to produce varying amounts of electrical power from the frequency converter as exemplified by the graphs shown in FIG. 5. Looking at FIG. 5 it can be seen that if one wished to drive the generator 4 to produce 30 Kw of electrical power from the frequency converter, then given the choice of running the engine 6 at 1100, 1300 or 1500 r.p.m., the most efficient or optimum speed at which to run the engine is 1100 r.p.m. at which the efficiency is substantially 24%, as compared with about 23% at 1300 r.p.m. and about 22% at 1500 r.p.m.

Figure 6:
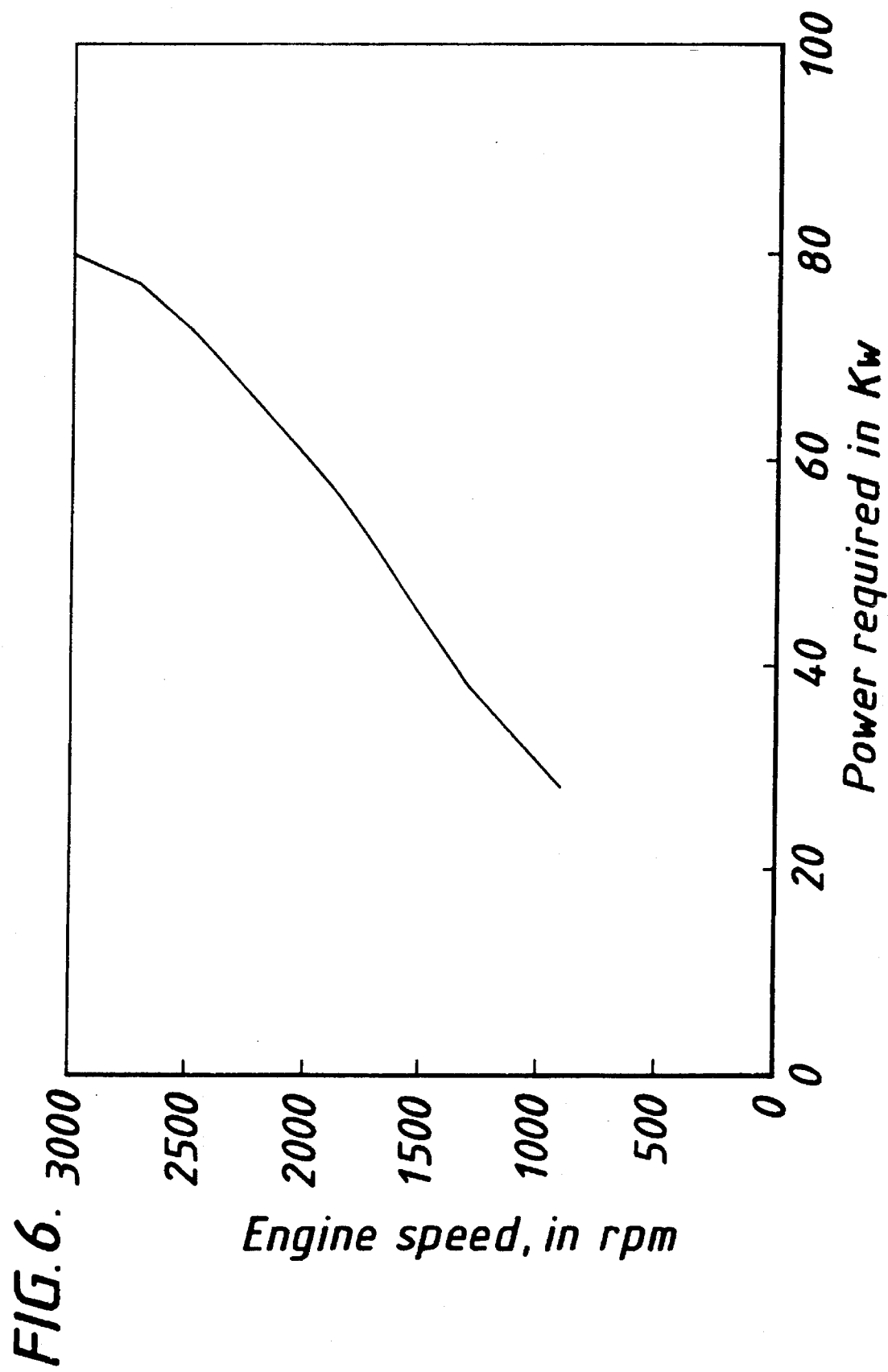
FIG. 6 shows a graph (derived from data used to produce the graphs in FIGS. 2 and 5) of variation in the engine speed in r.p.m. plotted against variation in electrical power required from the frequency converter means (i.e. the electrical power required from the frequency converter means to meet the electrical load demand), the graph indicating the engine speed at which the engine is operating at substantially optimum efficiency to drive the generator (when the frequency converter means is providing the required electrical power output).

Using the aforesaid data the controller 24 is programmed with an engine map or look-up tables, as exemplified by the graph in FIG. 6 representing the engine speed at which the engine can be run with optimum efficiency to drive the generator 4 to produce a desired electrical power output from the frequency converter. Accordingly the controller 24 is arranged to vary the speed of the engine 6 as a function of variation of the electrical power to be delivered from the frequency converter means 16.

The power measuring means 22 continuously provides information telling the controller 24 what electrical power is being demanded by the load 20 at any instant, whilst the power measuring means 26 continuously provides information telling the controller what the electrical power output from the generator 16 is. If there is a difference or error between the power demand and the frequency converter output, the controller 24 operates to vary the power outputs of the frequency converter 16 and the generator 4 to meet the demand. Should the power demand of the load 20 drop below the output of the frequency converter 16 (and hence the engine speed is to be decreased), the controller 24 (via the path 34) signals the frequency converter to reduce its power output to the new value being demanded. This reduction in power output causes a reduction in the electric current being demanded. Thus the generator 4 speeds up, which causes the engine 6 to similarly increase its speed. The increase in speed of generator 4 and engine 6 is only for a short time. This is because the controller 24, on noting that the engine speed signals from the speed measuring means 28 indicate an engine speed greater than the present engine speed setpoint, sends a signal on the path 32 causing the throttle 10 to close, and the controller consults the engine map (FIG. 6 to determine a new decreased engine speed setpoint corresponding with the new power demand by the load 20. Closure of the throttle 10 causes the speed of the engine 6 and generator 4 to drop. When the engine speed drops to the new setpoint this is detected by the controller 24 observing the engine speed signals from the speed measuring means 28, and the controller causes the throttle 10 to open and then operates the throttle to maintain the engine speed at substantially the new setpoint.

If there is an increase in the electrical power being demanded by the load 20 (and hence the engine speed is to be increased) an error between the load power demand and the power output from the frequency converter 16 occurs. The controller 24 consults the engine map to determine a new increased engine speed setpoint corresponding to the new increased electrical power load being demanded. The controller 24 opens the throttle 10 to increase the engine speed, and when the engine speed reaches the new setpoint (as indicated to the controller by signals from the speed measuring means 28) the controller operates the throttle to maintain the engine speed at substantially the new speed setpoint. The controller 24 then signals the frequency converter 16 to increase its electrical power output to that being demanded by the load 20. This causes the frequency converter 16 to draw increased current from the generator 4, and the controller 24 continues to operate the throttle 10 to maintain the engine speed at substantially the new setpoint.

At start-up, when the contact means 38 is interrupted, the controller 24 operates the engine 6 at a predetermined substantially constant speed until the frequency converter 16 produces an AC power output at the desired necessary voltage and in phase with the mains supply, whereupon the frequency converter causes closure of the contact means 38.

If desired, the controller 24 may be adapted to compensate for engine ageing or variation of its operating characteristics. Using the observation of the fuel measuring means 32 and the measured power output from the frequency converter 16, the controller 24 can continuously calculate the instantaneous efficiency of the engine 6. The controller 24 can be programmed to vary the throttle opening to vary the engine speed, preferably slightly, about the engine speed setpoint derived using the engine map such as shown in FIG. 6. In this way the optimum efficiency of the engine 6 can be determined and the engine run at that optimum.

Preferably the power generating arrangement 2 has a minimum power output from the frequency converter 16 which is less than the minimum demand by the load 20 and may have a maximum power output which matches or exceeds the likely maximum demand by the load. If the maximum demand is high a high performance high revving engine 6 may be used.

Or, alternatively, the system may be arranged so that the power output from the frequency converter 16 may be a predetermined fraction of the power demanded by the load, provided, for example, the load demand is above a predetermined minimum and below a predetermined maximum. Above the predetermined maximum load demand, any extra demand is met by the mains without the generator 4 making an extra power output contribution. Below the predetermined minimum load demand, all the load can be met by the output from generator 4 and frequency converter 16. In this system, because the generating arrangement 2 may only supply a predetermined portion of the total power demanded by the load above the predetermined minimum there is no need to run the engine 6 at high speed or full power for long periods. That predetermined portion or fraction may vary according to variation in the size of the power demand by the load.

We claim:

1. An electrical power generating arrangement from which an electrical power output is to be connected to electrical mains, said electrical power generating arrangement comprising:

a reciprocating internal combustion engine;

an electrical power generator rotatably driven by rotary drive from said reciprocating internal combustion engine;

frequency converter means for converting variable frequency AC from said generator to a substantially fixed frequency AC for delivery to said electrical mains; and control means including an engine map for controlling an engine speed of said reciprocating internal combustion engine, for varying the engine speed as a function of the electrical power output to be delivered from said frequency converter means, and for operating in accordance with said engine map which represents the engine speeds as a function of the electrical power output from said frequency converter means, said engine map calculated using values of thermal power input to said reciprocating internal combustion engine and electrical power output from said frequency converter means to determine engine efficiency at varying engine speeds, said engine map providing a particular engine speed corresponding to a particular electrical power output from said frequency converter means, and said particular engine speed being an engine speed at which said reciprocating internal combustion engine is operating at substantially optimum efficiency to produce said particular electrical power output from said frequency converter means.

2. An electrical power generating arrangement according to claim 1, wherein said frequency converter means is responsive to signals from said control means to vary the electrical power output from said frequency converter means.

3. An electrical power generating arrangement according to claim 2, wherein said control means is arranged for receiving signals indicating the electrical power demand by an external load and issuing a signal to vary the electrical power output from said frequency converter means to substantially equal the power demand by said load.

4. An electrical power generating arrangement according to claim 1, wherein said control means is arranged for controlling opening and closing of throttle means regulating supply of fuel to said engine.

5. An electrical power generating arrangement according to claim 1, wherein means is provided for producing a signal for transmission to said control means to indicate the speed of said engine.

6. An electrical power generating arrangement according to claim 1, wherein said control means comprises:

means for controlling opening and closing of throttle means regulating supply of fuel to said reciprocating internal combustion engine;

means for observing fuel consumption by said reciprocating internal combustion engine;

means for observing electric power output from said frequency converter means; and means for calculating the efficiency of the engine, wherein said control means varies an opening of said throttle means for varying the engine speed about an engine speed setpoint read from said engine map.

7. An electrical power generating arrangement according to claim 1, wherein said control means comprises computer means programmed with said engine map.

8. An electrical power generating arrangement according to claim 1, wherein said frequency converter means comprises a rectifier-inverter.

9. An electrical power generating arrangement according to claim 1, wherein the engine fuel is fuel gas.

10. An electrical power generating arrangement according to claim 1, wherein said control means is arranged to cause the speed of said engine to increase when an increase in the electrical power output from said frequency converter means is required.

11. An electrical power generating arrangement according to claim 1, wherein said control means is arranged to cause the speed of said engine to decrease when a decrease in the electrical power output from said frequency converter means is required.

12. A combined heat and power system from which the electrical power output is to be connected to electrical mains, said electrical power generating arrangement comprising:

a reciprocating internal combustion engine;

an electrical power generator rotatably driven by rotary drive from said reciprocating internal combustion engine;

frequency converter means for converting variable frequency AC from said generator to a substantially fixed frequency AC for delivery to said electrical mains; and control means including an engine map for controlling an engine speed of said reciprocating internal combustion engine, for varying the engine speed as a function of the electrical power output to be delivered from said frequency converter means, and for operating in accordance with said engine map which represents the engine speeds as a function of the electrical power output from said frequency converter means, said engine map calculated using values of thermal power input to said reciprocating internal combustion engine and electrical power output from said frequency converter means to determine engine efficiency at varying engine speeds, said engine map providing a particular engine speed corresponding to a particular electrical power output from said frequency converter means, and said particular engine speed being an engine speed at which said reciprocating internal combustion engine is operating at substantially optimum efficiency to produce said particular electrical power output from said frequency converter means.

* * * * *